US006913395B2

(12) United States Patent
Watanabe et al.

(10) Patent No.: US 6,913,395 B2
(45) Date of Patent: Jul. 5, 2005

(54) ASSEMBLY INCLUDING AN OPTICAL FIBER SOCKET AND AN OPTICAL FIBER PLUG

(75) Inventors: Yuji Watanabe, Yokohama (JP); Takashi Tsukamoto, Yokohama (JP); Tsuyoshi Hisano, Osaka (JP); Katsunori Kitagawa, Osaka (JP); Kenji Furufuji, Osaka (JP); Yasusuke Hioki, Tokyo (JP); Mikio Hojo, Tokyo (JP); Katsuyuki Nakano, Tokyo (JP)

(73) Assignees: Asahi Glass Company, Limited, Tokyo (JP); Sanwa Denki Kogyo Co., Ltd., Tokyo (JP)

( * ) Notice: Subject to any disclaimer, the term of this patent is extended or adjusted under 35 U.S.C. 154(b) by 182 days.

(21) Appl. No.: 10/247,643

(22) Filed: Sep. 20, 2002

(65) Prior Publication Data
US 2003/0068135 A1 Apr. 10, 2003

(30) Foreign Application Priority Data

Sep. 21, 2001 (JP) .................................... 2001-288747

(51) Int. Cl.[7] .............................................. G02B 6/36
(52) U.S. Cl. ........................ 385/78; 385/134; 439/135; 439/468; 439/473; 174/67
(58) Field of Search .................. 385/78, 134; 439/135, 439/468, 473; 174/67

(56) References Cited

U.S. PATENT DOCUMENTS

| 4,611,887 A | | 9/1986 | Glover et al. ............. 350/96.21 |
| 5,030,120 A | * | 7/1991 | Hartley ......................... 439/144 |
| 5,166,995 A | | 11/1992 | Briggs et al. .................. 385/58 |
| 5,243,678 A | * | 9/1993 | Schaffer et al. ............. 385/134 |
| 5,664,955 A | | 9/1997 | Arnett ......................... 439/135 |
| 5,760,139 A | | 6/1998 | Koike et al. ................. 525/200 |
| 6,271,312 B1 | | 8/2001 | Koike et al. ................. 525/199 |

FOREIGN PATENT DOCUMENTS

| EP | 0 677 756 | 10/1995 |
| EP | 0 962 799 | 12/1999 |
| EP | 1 072 918 | 1/2001 |
| JP | 1-189617 | 7/1989 |
| JP | 1-297604 | 11/1989 |
| JP | 9-127369 | 5/1997 |
| JP | 10-160969 | 6/1998 |
| WO | WO 01/40839 | 6/2001 |
| WO | WO 01/95002 A1 | 12/2001 |

OTHER PUBLICATIONS

IBM Technical Disclosure Bulletin, vol. 34, No. 1, XP–000210161, pp. 150–151, "Fiber–Optic Cable 90–Degree Connector Adapter", Jun. 1991.
Patent Abstracts of Japan, JP 9–127369, May 16, 1997.
Copies of the drawings and the photographs showing optical fiber connector plugs, which are exhibited in an exhibition held in Chiba, Japan from Jul. 16 to 19, 2001, (4 pages).

* cited by examiner

*Primary Examiner*—Dean A. Reichard
*Assistant Examiner*—Anton Harris
(74) *Attorney, Agent, or Firm*—Oblon, Spivak, McClelland, Maier & Neustadt, P.C.

(57) ABSTRACT

An assembly comprising a plastic optical fiber socket attachable to three modules in accordance with JIS standards and a plug; the plastic optical fiber socket including a body having a plug inlet port, a port cover mounted to the body so as to be automatically openable, a receptacle mounted to the body for connection with a plastic optical fiber cable, and a tensile retainer engaged with the body for retaining the plastic optical fiber cable; and the plug including a housing, an engagement portion fixed to the housing for engagement with the receptacle, and a beam formed on the housing, the beam made of elastic material or having an elastic structure.

30 Claims, 7 Drawing Sheets

ASSEMBLY INCLUDING AN OPTICAL FIBER SOCKET AND AN OPTICAL FIBER PLUG

TECHNICAL FIELD

The present invention relates to an assembly comprising a plastic optical fiber socket and a plug. More specifically, the present invention relates to an assembly comprising a plastic optical fiber socket and a plug, which has versatility in accordance with JIS standards, provides a dust-proofing structure, is easy to handle, is easy to install, and is capable of maintaining the high transmission performance of plastic optical fiber cables.

BACKGROUND ART

In recent years, equipment, which makes communication through an optical communication system using a plastic optical fiber cable, has been used in offices or somewhere else. Various sorts of connectors for connecting plastic optical fiber cables have been developed.

As one of methods for connecting plastic optical fiber cables, there has been known a method wherein one of plastic optical fiber cables, which is installed behind a wall or under a floor, has a leading end connected to a socket for a plastic optical fiber socket (hereinbelow, referred to as "optical socket") through a connector in alignment fashion, and the optical socket is connected to the other plastic optical fiber cable through a connector in alignment fashion. For example, JP-A-9-127369, JP-A-1-189617 and JP-A-1-297604 disclose optical socket, which can be used in the method stated just above.

However, the optical socket disclosed in JP-A-9-127369 creates problems that it has no versatility since the attachment frame and the connecting unit are formed in a shape suited to a specific purpose, and that it cannot be directly installed. It also creates problems that the structure is complicated, that the number of parts is big, and that installation is difficult.

In addition, dust invasion need to be minimized since the invasion of dust degrades the transmission performance of optical sockets or optical connectors. Although the optical socket disclosed in JP-A-1-297604 has versatility since the optical socket is attachable to three modules in accordance with JIS standards, the optical socket creates a problem for lack of a dust proof construction since the optical socket has no member covering the connecting unit of the optical connector because of a decrease in the number of parts and simplification in the structure.

Further, since the plug is connected in a direction perpendicular to a wall surface to install, the optical socket creates a problem that the projection of the plug is great and the optical fiber cable is susceptible to be externally affected.

The optical socket disclosed in JP-A-1-189617 is provided in the form of one or two modules in accordance with the JIS standards and has the connector provided with a dustproof port cover. Although the optical socket has a structure wherein the port cover is manually opened and closed and is housed in the connector, the optical socket creates problems in operationality that the port cover is too small to handle, and that the opening and closing operation of the port cover and the connecting operation of a plug need to be separately carried out. In particular, poor operationality is creates a fatal problem since optical sockets are usually installed in a corner on a wall surface or the like.

Additionally, since the plug is connected in a direction perpendicular to a wall surface to install, the optical socket creates a problem that the projection of the plug is great and the optical fiber cable is susceptible to be externally affected.

Further, since the optical sockets disclosed in the prior art have a structure wherein a plug is merely inserted into the optical socket (optical connector), the optical sockets also create a problem that plastic optical fiber cables fail to be firmly abutted together because of loose connection. In particular, an optical socket (optical connector), which is formed for connection in a direction perpendicular to a wall surface, cannot maintain the high transmission performance since the connected portions are susceptible to become loose because of the weight of a plug with the passage of time.

It is an object of the present invention to solve these problems.

It is an object of the present invention to provide an assembly comprising an optical socket and a plug (hereinbelow, referred merely to as "assembly" in some cases), which is specifically described below:

1) An optical socket, which is attachable to three modules in accordance with the JIS standards, is provided so as to be applicable to existing wiring accessories and be versatile, expanding the application of the socket.

2) An optical socket and a plug, wherein the direction of connecting the plug and the receptacle is located so as to be parallel with a wall surface to install a plastic optical fiber cable, whereby the projection of the plug from the wall surface can be minimized, and the plastic optical fiber is hardly to be externally affected by furniture or the like for maintaining the transmission performance. And a socket, wherein light rays transmitted through a plastic optical fiber cable go out in a downward direction (in a direction toward a floor), and it is difficult for him or her to look into the optical socket, whereby safety can be ensured even if the plug is detached, and a person is not adversely affected.

3) An optical socket, wherein the tensile retainer has a cable guide formed so as to correspond to the recommended minimum radius of a plastic optical fiber cable, whereby the cable can be fixed to be prevented from being bent with a smaller radius than the recommended minimum radius of a plastic optical fiber cable during installation for maintaining the transmission performance.

4) An optical socket, wherein a port cover is provided at a slant angle conforming to the tapered shape of a receptacle connection port, whereby the gap between the port cover and a receptacle can be eliminated to prevent dust from entering.

5) An optical socket, wherein the port cover has a guiding surface provided at a lower position than a body top surface, whereby the guiding surface of the port cover can be made sure, and the port cover can be opened and closed easily and automatically.

6) An optical socket, wherein the guiding surface of the port cover has both lateral sides formed with guiding grooves so as to guide beam leading portions of the plug, whereby the opening and closing operation of the port cover can be made smooth and well-balanced, and a dust-proof construction can be provided.

7) An optical socket, wherein the body has a tapered shape defined by a surface, which is in contact with a circular arc having a radius corresponding to the recommended minimum radius of the plastic optical fiber cable, whereby the projection of the body from the wall surface can be reduced to improve appearance, and the number of required parts can be decreased to improve cost performance.

8) An optical socket, wherein the body has a plug inlet port provided with a supporting surface for supporting the plug after connection, whereby the plug is prevented from swinging in a direction perpendicular to the supporting surface after insertion of the plug, and the optical socket can provide stable support. And an optical socket and a plug, wherein even if the plug is externally affected, the plug can be supported by the supporting surface, making it difficult for the fiber cable to be externally affected directly.

9) An optical socket and a plug, wherein the supporting surface has a front edge chamfered in the direction of connecting the plug to the receptacle, whereby the plug can be inserted smoothly without a catch, and the projection of the body from a decorative plate can be reduced to improve appearance.

10) An optical socket, wherein the body has a rear side provided with a cable guide, which is formed with the recommended minimum radius of the plastic optical fiber cable, whereby the cable can be fixed to be prevented from be bent with a smaller radius than the recommended minimum radius during installation, maintaining transmission performance.

11) An optical socket, wherein the cable guide is provided at a position apart from the receptacle by a certain distance, whereby the plastic optical fiber inserted into the receptacle can be suppressed from swinging, avoiding external affection to the fiber.

12) An optical socket, wherein the body has a rear side provided with an engageable member so as to detachably mount the receptacle thereto, whereby the receptacle can be attached and detached easily, making installation easier.

13) An optical socket, wherein the tensile retainer has a ridge provided thereon to provide a fastening portion for sandwiching a plastic optical fiber cable, whereby the ridge as the fastening portion can prevent the plastic optical fiber cable from being drawn, which is assumed to be caused during installation, and the transmission performance can be maintained.

14) An optical socket, wherein the body and the tensile retainer have engageable members so as to detachably couple the body and the tensile retainer, whereby the tensile retainer can be easily detached from the body, making installation easier and expanding application range, in, e.g., the case wherein installation is carried out at a place where the gap behind the wall is narrow. And an optical socket, wherein the tensile retainer can be firmly held to stabilize the plastic optical fiber cable during installation and to maintain the transmission performance.

15) An optical socket, wherein the tensile retainer includes a rear plate having a narrower width than a wall-embedded box, the tensile retainer being housed in the wall-embedded box with the rear plate of the tensile retainer having the plastic optical fiber cable extending therearound, whereby the cable can be easily housed in the wall-embedded box during installation, making the installation easier.

16) An optical socket, wherein the receptacle, which is connected to a plastic optical fiber cable having an end aligned by cylindrical flexible parts (boots) having elasticity, is used, whereby workability is improved, and stress applied to the plastic optical fiber cable during bending can be dispersed to protect a plastic optical fiber.

17) an optical socket, wherein the receptacle, which includes a receptacle housing having an engagement space engageable with the plug, and a rear housing having a connector to be connected to a plastic optical fiber cable and formed so as to be reduced from the receptacle housing, is used, the receptacle can be firmly mounted to the body, and the receptacle can be firmly connected to the plug.

18) An optical socket and a plug, wherein the receptacle housing has gaps provided on both outer sides of a connection port (between lateral walls of the receptacle and the plug inlet port of the body) so as to engageable with the beams of the plug and leading portions of the beams, whereby the connection between the beams of the plug and the receptacle is made firm, preventing the plug from swinging in directions perpendicular to the connecting direction.

19) An optical socket, wherein the receptacle housing has a connection port formed in a tapered shape thereon, whereby the gap between the port cover and the receptacle can be eliminated, preventing dust from entering.

20) An optical socket, wherein the rear housing has a tapered guide and an engageable shoulder formed thereon, whereby it is possible to avoid mistaking the mounting direction of the receptacle.

21) An optical socket, wherein the rear housing has flanges, which are different from each other in terms of an increase in size, whereby it is possible to avoid mistaking the mounting direction of the receptacle.

22) An optical socket and a plug, wherein the receptacle is configured to house an engagement latch and beam leading portions of the plug in reduced portions of the rear housing, whereby the receptacle can be firmly fixed to the body, and the connection between the receptacle and the plug can be ensured.

23) A plug, wherein the beams have leading portions, each of which is longer than the engagement portion and has a projection tapered toward a leading edge, whereby the beams can be guided during connection to make the connection easier, to fasten the plastic optical fiber cable firmly, and to protect the engagement portion of the plug.

24) A plug, wherein the housing of the plug has a projected rib formed in a substantially semicircular shape on a substantially central portion on an outer surface thereof, whereby the rib can be brought into contact with the supporting surface of the body to prevent the plug from swinging in directions perpendicular to the supporting surface after insertion of the plug.

25) A plug, which includes an optical fiber cable fastener, which is formed in a U-character shape in section so as to have substantially the same width as a longer radius of the plastic optical fiber cable in section, and which has both side wall formed with slits to sandwich a tension member of the plastic optical fiber cable therein; and a fiber cable fastener housing groove to house the optical fiber cable fastener therein, whereby even if the plug is externally affected, the fiber is hardly to be directly and externally affected since the engagement portion can be protected.

26) a plug, wherein the optical fiber cable fastener housing groove has a rear portion provided with a cable holding projection to sandwich the plastic optical fiber cable therebetween, whereby a plastic optical fiber cable can be held more firmly.

27) A plug, wherein the engagement space of the receptacle housing includes engageable grooves formed in asymmetric fashion so as to be engageable with engageable members of the plug; the engagement portion of the plug includes an engageable cover, which has ridges formed on upper and lower surfaces on and along one of lateral sides in a longitudinal direction thereof; and the housing of the plug has engageable cover fastening grooves engraved on a leading portion in a substantially central portion, the engageable cover fastening grooves extending along one of lateral sides so as to be engageable with the ridges on the engageable cover, whereby it is possible to avoid mistaking the connecting direction (the connecting sides).

DISCLOSURE OF INVENTION

1) The present invention provides an assembly, which comprises a plastic optical fiber socket attachable to three modules in accordance with JIS standards and a plug;

the plastic optical fiber socket including:

a body having a plug inlet port, a port cover mounted to the body so as to be automatically openable, a receptacle mounted to the body for connection with a plastic optical fiber cable, and a tensile retainer engaged with the body for retaining the plastic optical fiber cable; and the plug including:

a housing, an engagement portion fixed to the housing for engagement with the receptacle, and a beam formed on the housing, the beam made of elastic material or having an elastic structure.

2) The present invention provides an assembly, which comprises a plastic optical fiber socket attachable to three modules in accordance with JIS standards and a plug;

the plastic optical fiber socket including:

a body having a plug inlet port, a port cover mounted to the body so as to be automatically openable, a receptacle mounted to the body for connection with a plastic optical fiber cable, and a tensile retainer engaged with the body for retaining the plastic optical fiber cable; and the plug including:

a housing, an engagement portion fixed to the housing for engagement with the receptacle, and a beam formed on the housing, the beam made of elastic material or having an elastic structure;

wherein a direction of connecting the receptacle and the plug is parallel to a wall, to which the plastic optical fiber socket is installed.

3) The present invention provides an assembly, which comprises a plastic optical fiber socket attachable to three modules in accordance with JIS standards and a plug;

the plastic optical fiber socket including:

a body having a plug inlet port, a port cover mounted to the body so as to be automatically openable, a receptacle mounted to the body for connection with a plastic optical fiber cable, and a tensile retainer engaged with the body for retaining the plastic optical fiber cable, the tensile retainer including a cable guide, which is formed with a recommended minimum radius of the plastic optical fiber cable; and the plug including:

a housing, an engagement portion fixed to the housing for engagement with the receptacle, and a beam formed on the housing, the beam made of elastic material or having an elastic structure;

wherein a direction of connecting the receptacle and the plug is parallel to a wall, to which the plastic optical fiber socket is installed.

4) The present invention provides the assembly defined in any one of items 1) to 3), wherein the port cover is provided at a slant angle in the body, the slant angle conforming to a tapered shape of a connection port of the receptacle.

5) The present invention provides the assembly defined in any one of items 1) to 4), wherein the port cover has a guiding surface formed thereon at a lower position than a top surface of the body.

6) The present invention provides the assembly defined in item 5), wherein the guiding surface of the port cover has both sides formed with guiding grooves to guide beam leading portions of the plug.

7) The present invention provides the assembly defined in any one of items 1) to 6), wherein the body has a tapered shape at a rear portion in a longitudinal direction thereof, the tapered shape being defined by a surface in contact with a circular arc having a radius corresponding to a recommended minimum radius of the plastic optical fiber cable.

8) The present invention provides the assembly defined in any one of items 1) to 7), wherein the body has a supporting surface formed in front of a plug inlet to support the plug after connection.

9) The present invention provides the assembly defined in item 8), wherein the supporting surface has a front edge chamfered in a direction of connecting the plug and the receptacle.

10) The present invention provides the assembly defined in any one of items 1) to 9), wherein the body has a rear side provided with a cable guide, which is formed with a recommended minimum radius of the plastic optical fiber cable.

11) The present invention provides the assembly defined in item 10, wherein the cable guide is provided at a position apart from the receptacle by a certain distance.

12) The present invention provides the assembly defined in any one of items 1) to 11), wherein the body has a rear side provided with an engageable member so as to detachably mount the receptacle thereto.

13) The present invention provides the assembly defined in any one of items 1) to 12), wherein the tensile retainer has a fastener provided thereon, the fastener having a ridge to sandwich the plastic optical fiber cable thereon.

14) The present invention provides the assembly defined in any one of items 1) to 13), wherein the body and the tensile retainer have engageable members so as to detachably couple the body and the tensile retainer.

15) The present invention provides the assembly defined in any one of items 1) to 14), wherein the tensile retainer includes a rear plate having a narrower width than a wall-embedded box, the tensile retainer being housed in the wall-embedded box with the rear plate of the tensile retainer having the plastic optical fiber cable extending therearound.

16) The present invention provides the assembly defined in any one of items 1) to 15), wherein the receptacle is connected to the plastic optical fiber cable, which has been aligned by a flexible cylindrical member (boot) having elasticity.

17) The present invention provides the assembly defined in any one of items 1) to 16), wherein the receptacle includes:

a receptacle housing having an engagement space engageable with the plug, and a rear housing having a connector to be connected to the plastic optical fiber cable, the rear housing being formed so as to reduce from the receptacle housing.

18) The present invention provides the assembly defined in item 17, wherein the receptacle housing has gaps provided on both outer sides of a connection port (between lateral walls of the receptacle and the plug inlet port of the body) so as to engageable with the beams of the plug and leading portions of the beams.

19) The present invention provides the assembly defined in claim 17) or 18), wherein the receptacle housing has a connection port formed in a tapered shape thereon.

20) The present invention provides the assembly defined in any one of items 17) to 19), wherein the rear housing has a tapered guide and an engageable shoulder formed thereon.

21) The present invention provides the assembly defined in any one of items 17) to 20), wherein the rear housing has flanges, which are different from each other in terms of an increase in size.

22) The present invention provides the assembly defined in any one of items 17) to 21), wherein the rear housing has reduced portions formed therein so as to house an engageable member of the body and the beam leading portions of the plug.

23) The present invention provides the assembly defined in any one of items 1) to 22), wherein the beams have leading portions, each of which is longer than the engagement portion and has a projection tapered toward a leading edge.

24) The present invention provides the assembly defined in any one of items 1) to 23), wherein the housing has a projected rib formed in a substantially semicircular shape on a substantially central portion on an outer surface thereof.

25) The present invention provides the assembly defined in any one of item 1) to 24), the plug further including an optical fiber cable fastener, which is formed in a U-character shape in section so as to have substantially the same width as a longer radius of the plastic optical fiber cable in section, and which has both side wall formed with slits to sandwich a tension member of the plastic optical fiber cable therein; and the housing having an optical fiber cable fastener housing groove engraved thereon so as to house and fix an optical fiber cable fastener therein.

26) The present invention provides the assembly defined in item 25, wherein the optical fiber cable fastener housing groove has a rear portion provided with a cable holding projection to sandwich the plastic optical fiber cable therebetween.

27) The present invention provides the assembly defined in any one of items 1) to 26), wherein the engagement space of the receptacle housing includes engageable grooves formed in asymmetric fashion so as to be engageable with engageable members of the plug;

the engagement portion of the plug includes an engageable cover, which has ridges formed on upper and lower surfaces on and along one of lateral sides in a longitudinal direction thereof;

the housing of the plug has engageable cover fastening grooves engraved on a leading portion in a substantially central portion, the engageable cover fastening grooves extending along one of lateral sides so as to be engageable with the ridges on the engageable cover.

BEST MODE FOR CARRYING OUT THE INVENTION

Figure 1:
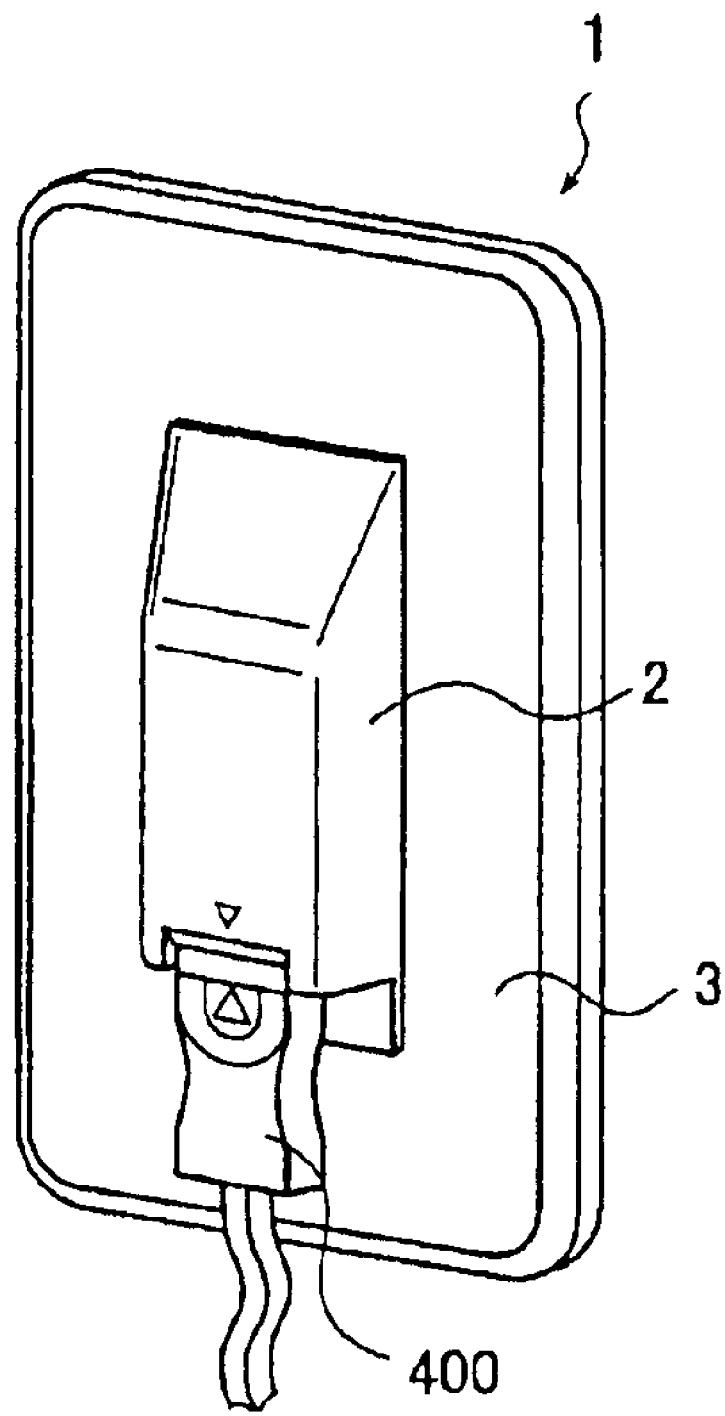
FIG. 1 is a perspective view showing how to an optical socket and a plug are connected together.

Now, the assembly including an optical socket and an optical fiber plug according to the present invention will be described in order and in detail in reference to preferable embodiments shown in the accompanying drawings.

In the drawings, like reference numerals designate identical or similar parts.

The following explanation of the optical socket and the optical fiber plug will be made for the case wherein the socket and the plug connect flat duplex plastic optical fiber cables, which have two plastic optical fibers provided therein and two reinforcing wires as tension members provided on both sides of the fibers therein, and which is covered by a resin covering cable made of resin material. However, the application of the optical socket and the optical fiber plug according to the present invention is not limited to this case. The optical socket and the optical fiber plug may connect any form of plastic optical fiber cables. The optical socket and the optical fiber plug may be ones that are used for plastic optical fiber cables, which have one or more than two plastic optical fibers provided therein and one or more than two tension members provided therein.

The present invention is directed to an assembly, which comprises a plastic optical fiber socket attachable to three modules in accordance with JIS standards, including a body having a plug inlet port, a port cover mounted to the body so as to be automatically openable, a receptacle mounted to the body for connection with a plastic optical fiber cable, and a tensile retainer engaged with the body for retaining the plastic optical fiber cable; and a plug including a housing, an engagement portion fixed to the housing for engagement with the receptacle, a beam formed in the housing, the beam made of elastic material or having an elastic structure. FIG. 1 is a perspective view showing how the optical fiber socket and the optical fiber plug according to the present invention are connected to provide the assembly.

In FIG. 1, reference numeral 1 designates the optical socket, reference numeral 2 designates a connector, reference numeral 3 designates a decorative plate, and reference numeral 400 designates the plug.

In the assembly according to the present invention, the direction for connecting the optical socket 1 and the plug 400 is parallel to a wall surface, to which the optical socket 1 is attached. This connection structure can minimize the projection of the plug from the wall surface and maintain transmission performance by making it difficult for furniture or the like to externally affect a plastic optical fiber. Even if the plug 400 is unintentionally detached, a person is not adversely affected, and safety can be ensured. This is because light rays transmitted through a plastic optical fiber cable go out in a downward direction (in a direction toward a floor), and because it is difficult for him or her to look into the optical socket.

Figure 2:
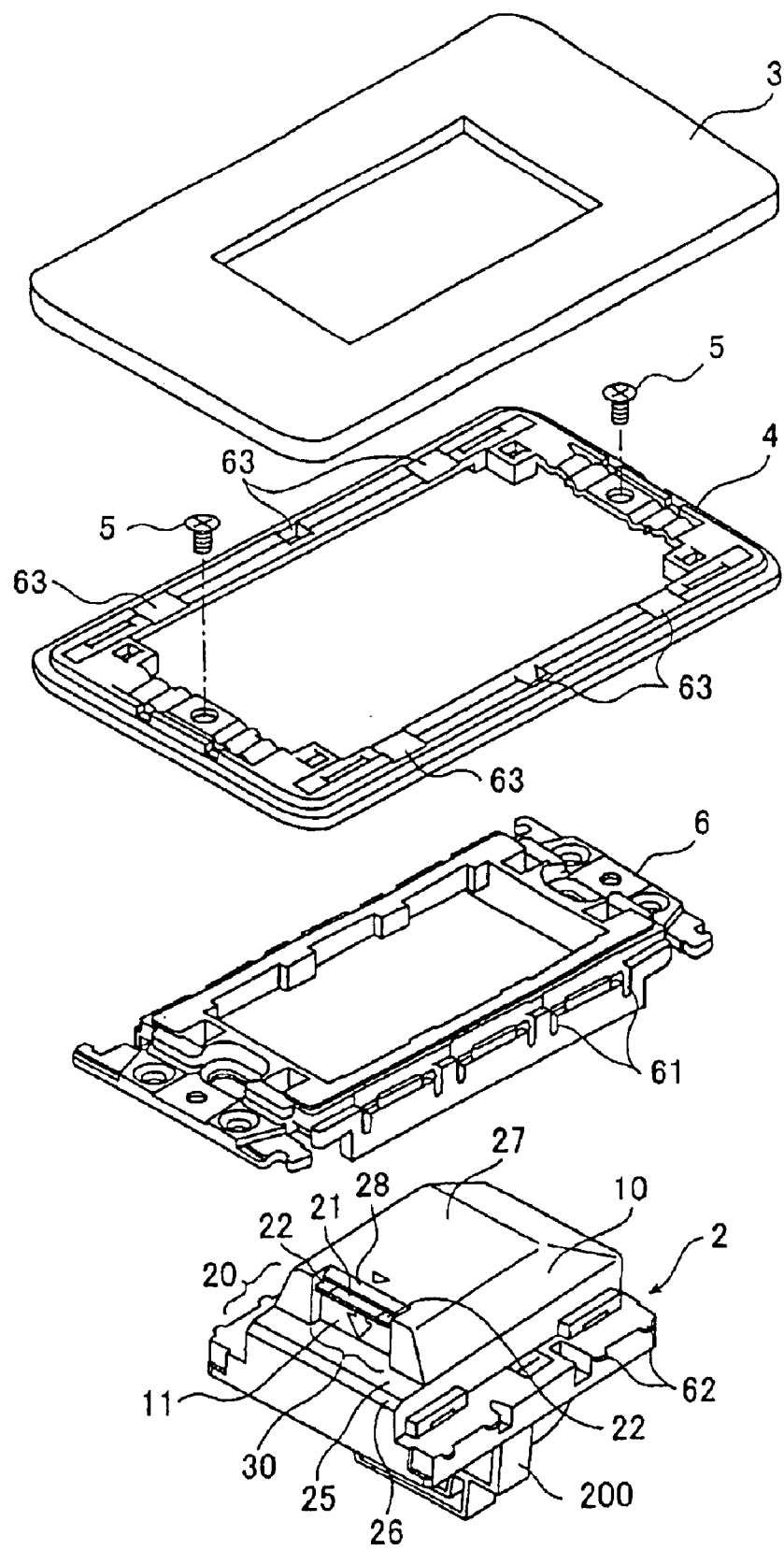
FIG. 2 is an exploded perspective view of the optical socket.

FIG. 2 is an exploded perspective view of the optical socket 1.

In FIG. 2, reference numeral 2 designates the connector, reference numeral 4 designates a plate frame, reference numeral 5 designates plate attachment screws, and reference numeral 6 designates an attachment frame.

The optical socket 1 includes the attachment frame 6 molded so as to be attachable to the plate frame 4, the plate frame 4 used for coupling the attachment frame 6 and the decorative plate 3 stated in detail later and molded so as to be attachable to a wall-embedded box (not shown) in accordance with the JIS standards, the decorative plate 3, and the connector 2 for connecting one of plastic optical cables 600 embedded in a wall and the other plastic optical cable. The connector 2 and the attachment frame 6 are engaged by engagement projections 62 and engagement slots 61. The optical socket is assembled by coupling the attachment frame 6 to the plate frame 4 by the plate attachment screws 5 and engaging the decorative plate 3 with the plate frame 4 by engagement shoulders 63 and elastic engagement latches not shown to couple the decorative plate 3 to the attachment frame 6. This arrangement allows the optical socket 1 to be versatile and to increase in its range of application since the socket can be attached to a wall-embedded box in accordance with the JIS standards.

Figure 3:
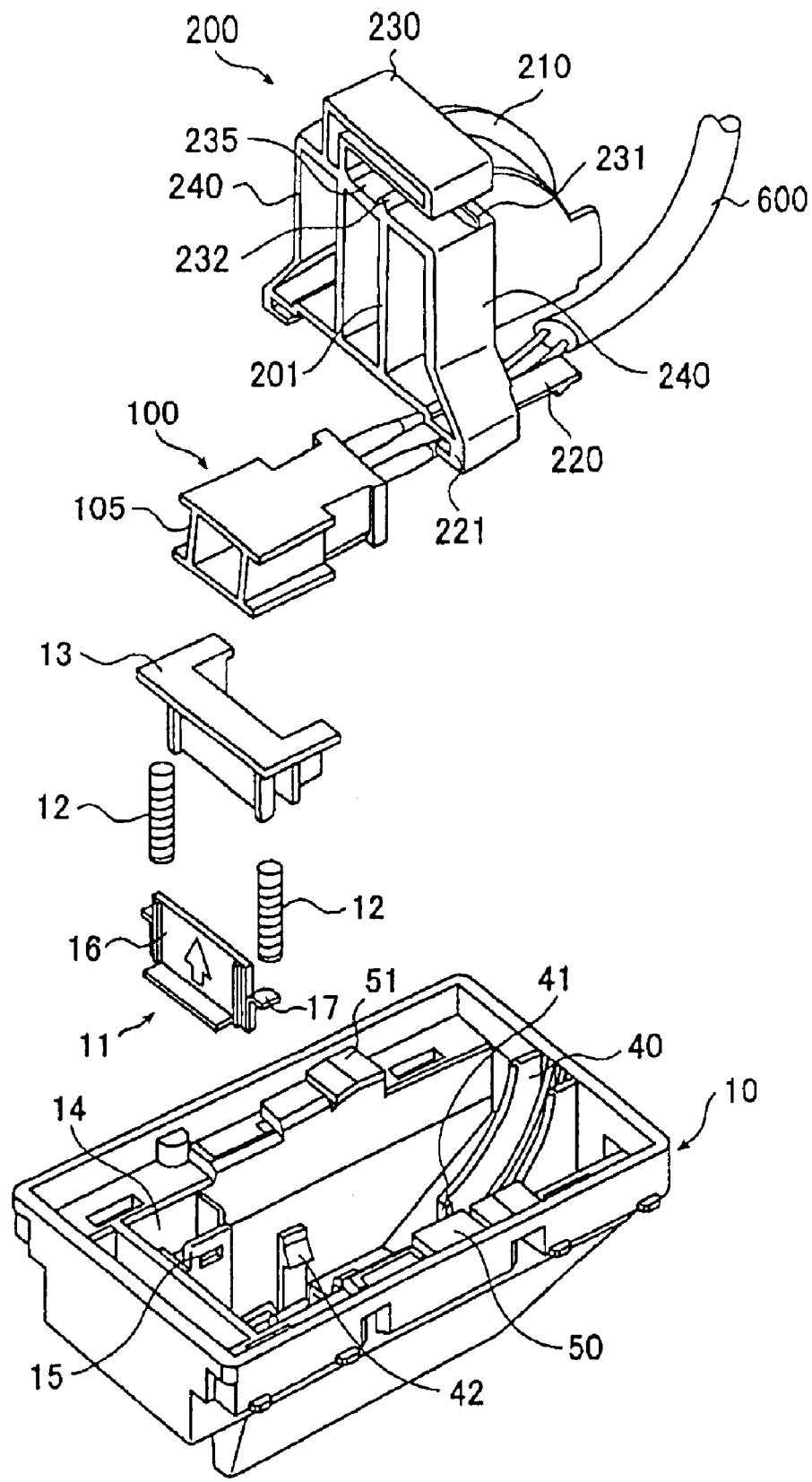
FIG. 3 is an exploded perspective view of a connector.

Referring to FIG. 2 and FIG. 3, explanation of a body 10 will be made.

In FIG. 2, reference numeral 2 designates the connector, reference numeral 10 designates the body, reference numeral 11 designates a port cover, reference numeral 20 designates an plug inlet, reference numeral 21 designates a guiding surface, reference numeral 22 designates guiding grooves, reference numeral 25 designates a supporting surface, reference numeral 27 designates a top surface, reference numeral 28 designates a slant surface, and reference numeral 30 designates a plug inlet port. In FIG. 3, reference numeral 11 designates the port cover, reference numeral 12 designates springs, and reference numeral 13 designates a rear cover.

The connector 2 is made up of the body 10 as a main part, which has the plug inlet 20 for the plug 400 formed thereon, the port cover 11 for the plug inlet 20, which is mounted to the body 10 by the springs 12 and the rear cover 13, and a receptacle 100, which is provided on a rear side of the body 10 and holds the tensile retainer 200 for retaining a plastic optical fiber cable 600 in a wall and a leading edge of the plastic optical fiber cable 600.

The plug inlet 20 of the body 10 is made up of the port cover 11, from which the guiding surface 21 with the guiding grooves 22 projects, and the plug inlet port 30, which is formed between the top surface 27 with the slant surface 28 held thereby and the supporting surface 25.

The port cover 11 of the body 10 is fixed by putting the port cover 11, the springs 12 and the rear cover 13 into a cover receptacle 14 in this order and engaging elastic engagement latches (not shown) of the rear cover 13 with engagement shoulders 15 of the body 10. The port cover 11 is engaged with a body insertion portion (not shown) through guiding pieces 17 so as to be slidable in opening and closing operation. When leading portions of the plug 400 is pushed toward the supporting surface 25, being is gotten touch with the guiding surface 21, the port cover 11 is opened by depression of the springs 12 to receive the plug 400 into the plug inlet 20 since the port cover 11 has the guiding surface 21 extending substantially parallel with the top surface 27 of the body 10. This arrangement makes the port cover 11 automatically openable and closable to facilitate the connecting operation between the optical socket and the optical fiber plug and can make the opening and closing operation of the port cover 11 and the connecting operation by a single action. Additionally, when the socket is not used, the port cover 11 is kept closed by the urging force of the springs 12 to shield the receptacle 100 from outside, providing a dust-proof structure. As a result, it is possible to maintain the high transmission performance of the plastic optical fiber cable.

The port cover 11 has a gating surface 16 provided so as to extend from the top surface 27 toward the supporting surface 25 at the same angle (in the same tapered shape) as a connection port 105 of the receptacle 100 to be mounted in the body 10, which will be stated later. This arrangement can eliminate the gap between the port cover 11 and the connection port 105 of the receptacle 100 to prevent dust from entering. This arrangement can also make the opening and closing operation of the port cover smooth and well balanced, providing a dust-proof structure even during connection.

Even if the port cover 11 is fully opened, the guiding surface 21 of the port cover 11 is located in touch with the supporting surface 25 stated later, and the guiding surface 21 is not completely housed in the body 10 (the guiding surface 21 is located on the supporting surface 25). This arrangement can make the opening and closing operation of the port cover smooth and well balanced.

The body 10 has a front end in a longitudinal direction provided with the plug inlet 20, which includes the port cover 11 and the supporting surface 25.

The port cover 11 has a top end formed with the guiding surface 21, which guides the leading portions of the plug along a direction perpendicular to the longitudinal direction of the body 10, and which is formed in concave fashion at a lower position than the top surface 27 of the body 10 so as to extend parallel to the supporting surface 25. The top surface 27 has an end close to the plug inlet 20 formed with the slant surface 28, which serves to make the port cover 11 easily visible and to prevent the leading portions 411 of the plug 400 from improperly moving back and forth in the longitudinal direction of the body 10 after having put the plug 400 on the guiding surface 21. The guiding surface 21 has both lateral sides in the longitudinal direction formed with the guiding grooves 22, on which the leading portions 411 of the plug 400 are put. This arrangement can not only facilitate connection between the optical socket and the plug but also avoid connection trouble that is caused when the leading portions 411 of the plug improperly moves back and forth during connection of the optical socket and the plug to make the leading portions 411 apart from the guiding surface 21.

Figure 4:
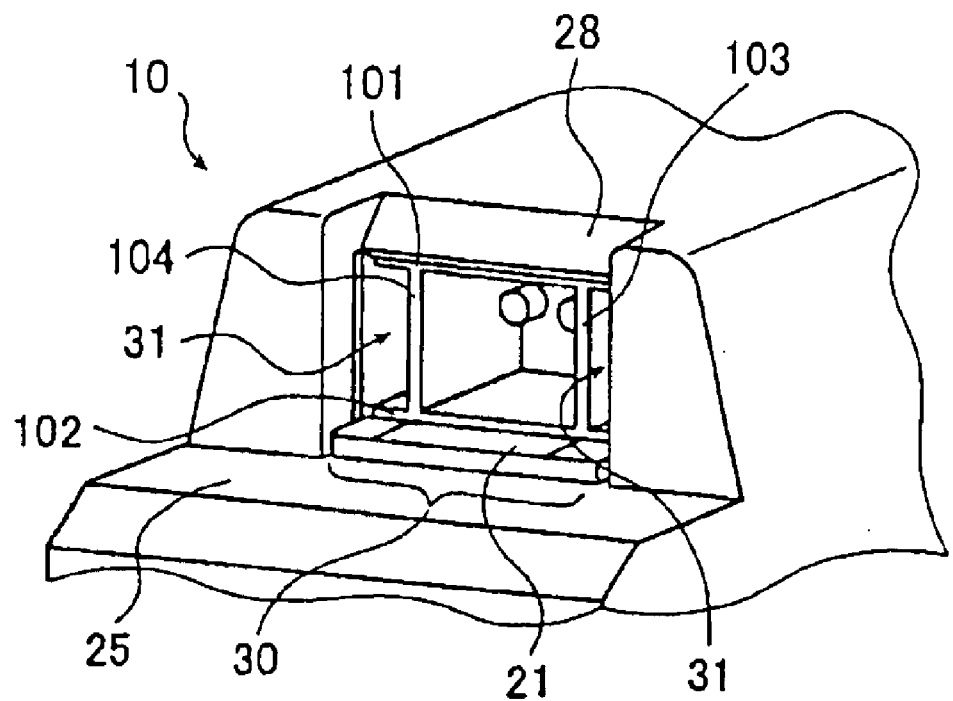
FIG. 4 is a schematic perspective view showing a plug inlet.

The plug inlet 20 has the supporting surface 25 formed therein, and the supporting surface 25 is located at a lower position than the guiding surface 21 of the port cover 11 as stated earlier (see FIG. 4). Since the supporting surface 25 gets in contact with a projected rib 420 (which projects by substantially the same thickness as the height of the guiding surface 21) of the plug 400 stated later to support the plug 400, the plug 400 can be suppressed to swing in the vertical direction with respect to the supporting surface 25, maintaining the high transmission performance of a plastic optical fiber cable. A front end 26 of the plug inlet port in the longitudinal direction is chamfered in the direction of connecting the receptacle 100 and the plug 400, facilitating the insertion of the plug 400.

FIG. 4 is a schematic perspective view showing the plug inlet port 30 formed in the body 10, wherein the port cover 11 is opened.

In FIG. 4, reference numeral 21 designates the guiding surface of the port cover 11, reference numeral 30 designates the plug inlet port, reference numeral 101 designates an upper wall of the receptacle, reference numeral 102 designates a lower wall of the receptacle, and reference numerals 103 and 104 designate lateral walls of the receptacle.

The receptacle 100, which has been housed in a mounting space of the body 10, has the upper wall 101 and the lower wall 102 stated later extending from both lateral walls 103, 104 to form gaps 31 along with both end surfaces of the plug inlet port 30. Each of the gaps 31 is formed in a size to accept each of beams 410 of the plug 400. This arrangement can guide the leading portions 411 of the plug 400 into the body 10 during insertion of the plug 400 and cause the beams 410 of the plug 400 to be inserted into the gaps 31 to firmly fix the beams there so as to make the connection between the optical fiber connector and the plug firm, suppressing the plug 400 from swinging in a direction perpendicular to the connecting direction and maintaining the high transmission performance of a plastic optical fiber cable.

As shown in FIG. 2, the body 10 is tapered from a position apart from the front end in the longitudinal direction by substantially ⅔ of the length of the body in the longitudinal direction to a rear end in the longitudinal direction. The tapered shape is defined by a surface, which is in contact with a circular arc having a radius corresponding to the recommended minimum radius of the plastic optical fiber cable 600 to be housed in the body 10 (the outer peripheral surface of a cable guide 40). This arrangement can prevent dust from being deposited on a rear portion of the body 10 in the longitudinal direction (the tapered surface) and the plastic optical fiber cable from being damaged (bent) by forcible bending. This arrangement can also avoid directing the body 10 in a wrong direction.

Explanation of the inner portion (the rear surface) of the body 10 will be made in reference to FIG. 3.

FIG. 3 is an exploded perspective view of the connector 2. In FIG. 3, reference numeral 40 designates the cable guide, and reference numeral 41 designates a ridge.

At a position close to the rear end in the longitudinal direction and close to a central portion in the direction perpendicular to the longitudinal direction in the body 10 is formed the cable guide 40 for retaining the plastic optical fiber cable. The cable guide 40 is formed in a circular shape having a radius corresponding to the recommended minimum radius of the plastic optical fiber cable. The cable guide 40 has a width equal to the longer radius in section of the plastic optical fiber cable 600 to be extended between both walls therein. The cable guide 40 has the ridge 41 for preventing the plastic optical fiber cable from shifting in the longitudinal direction formed at an end close to a portion for housing the receptacle 100. The cable guide 40 (or, the end thereof close to the portion for housing the receptacle 100) is formed so as to be apart from the portion for mounting the receptacle 100 by a certain distance. This arrangement can not only prevent the plastic optical fiber cable 600 from being damaged (bent) by forcible bending but also provides a degree of freedom in the connection length between the plastic optical fiber cable 600 and the receptacle 100 to facilitate the mounting operation of the optical socket.

It is preferable that the recommended minimum radius of the plastic optical fiber cable is 25 mm.

The body 10 has an elastic engagement latch 42 provided therein, which is engaged with an engagement shoulder 123 provided on the receptacle 100 and the body includes the portion for housing the receptacle 100. This arrangement allows the body 10 and the receptacle 100 to be attached and detached repeatedly, improving the workability in mounting operation or maintenance.

Now, explanation of the tensile retainer 200 will be made in reference to FIG. 3.

In FIG. 3, reference numeral 200 designates the tensile retainer, reference numeral 201 designates a rear plate, reference numeral 210 designates a cable guide, reference numeral 230 designates a fastening portion, reference numerals 231 and 232 designate ridges, and reference numeral 235 designates a sandwiching space.

The tensile retainer 200 includes the cable guide 210 to be mated with the cable guide 40 of the body 10, the fastening portion 230 for fastening the plastic optical fiber cable 600 thereto, elastic engagement latches 220 engageable with the body 10, engagement recesses 221, and the rear plate 201 with side walls 240 provided thereon so as to extend around the plastic optical fiber cable 600 in the width direction of the tensile retainer 200. These parts may be integrally molded to form the tensile retainer 200 or be independently molded and engaged or fixed together so as to form the tensile retainer 200.

The cable guide 210 is formed in a circular shape having a radius corresponding to the recommended minimum radius of the plastic optical fiber cable 600. It is preferable that the recommended minimum radius of the plastic optical fiber cable is 25 mm. The cable guide 210 has a width equal to the longer radius in section of the plastic optical fiber cable 600. The fastening portion 230 for the plastic optical fiber cable is provided at the end of the cable guide 210 close to the rear plate 201. The fastening portion 230 is formed in a U-shaped cross-sectional shape so as to provide the sandwiching space 235 having a gap substantially equal to the shorter radius in section (the smaller thickness) of the plastic optical fiber cable 600. In the sandwiching space 235, the ridge 231 for fastening the plastic optical fiber cable 600 is provided in the longitudinal direction of the sandwiching space 235 (in a direction perpendicular to the cable guide 210) to sandwich the plastic optical fiber cable 600 therein. In the sandwiching space 235, the ridge 232 is also provided in a direction perpendicular to the longitudinal direction of the rear plate 201 (in the longitudinal direction of the cable guide 210) to prevent the plastic optical fiber cable 600 from detaching itself from the cable guide 210. By this arrangement, the cable guide can be mated with the cable guide 40 of the body 10 to fasten the plastic optical fiber cable in substantially semicircular fashion, preventing the plastic optical fiber cable from being damaged (bent) by forcible bending. The plastic optical fiber cable can be firmly fastened to minimize damage caused by a tensile force applied to the plastic optical fiber cable in the longitudinal direction thereof.

The tensile retainer 200 includes the rear plate 201, which is formed to extend around the plastic optical fiber cable 600 in the width direction of the tensile retainer 200, and which has a narrow width than the wall-embedded box. The rear plate 201 has the side walls 240. This arrangement can suppress the plastic optical fiber cable from being damaged since the plastic optical fiber cable is prevented from forcibly bent to be housed in the optical socket (the wall-embedded box). Additionally, the arrangement can facilitate assembling of the optical socket.

The tensile retainer 200 may be detachably mounted to the body 10 by engaging the engagement recesses 221 and the elastic engagement latches 220 provided on lower portions of both side walls 240 with engageable convexes 50 and engagement projections 51 provided on the body 10 at a substantially central portion in the longitudinal direction of the body 10. This arrangement can improve the workability in mounting operation or maintenance. The tensile retainer can be firmly fixed to hold the optical fiber cable in stable fashion after installation, maintaining the transmission performance of the cable.

Figure 5:
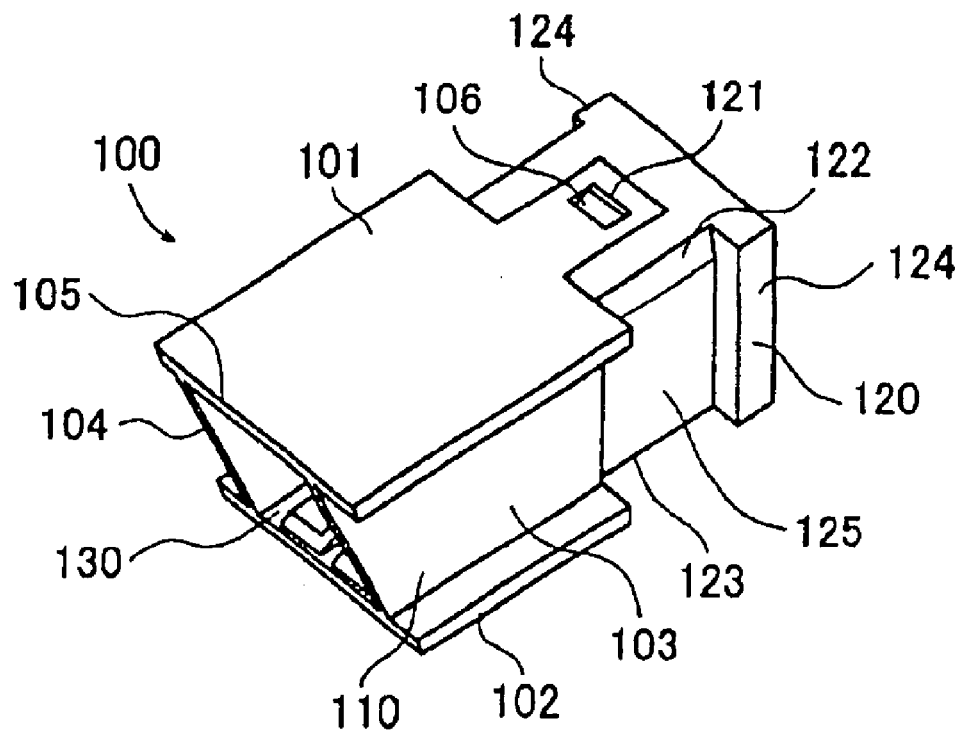
FIG. 5 is a schematic perspective view of a receptacle.

FIG. 5 is a schematic perspective view of the receptacle 100, wherein the tapered shape of the connection port 105 is shown in exaggerated fashion.

In FIG. 5, reference numeral 100 designates the receptacle, reference numeral 101 designates the upper wall, reference numeral 102 designates the lower wall, reference numerals 103 and 104 designate the lateral walls, reference numeral 105 designates the connection port, reference numeral 110 designates a receptacle housing, reference numeral 120 designates a rear housing, reference numeral 122 designates a tapered guide, reference numeral 123 designates the engageable shoulder, reference numeral 124 designates flanges, and reference numeral 130 designates an engagement space.

The receptacle 100 includes the receptacle housing 110 and the rear housing 120.

The receptacle housing 110 is a hollow and rectangular parallelepiped member, which includes the engagement space 130 defined by the upper wall 101, the lower wall 102 and the lateral walls 103, 104, the spaces (the gaps 31) defined by a projected portion of the upper wall 101, a projected portion of the lower wall 102 and both lateral walls 103, 104 for engagement with the beams of the plug stated later, and an engageable shoulder 106 engageable with the rear housing 120. The engagement space 130 is a space, which includes a member for connection between the receptacle 100 and the plug 400 by engagement with an engagement portion 415 of the plug 400 stated later. In the engagement space 130, engageable grooves are engraved in asymmetric fashion so as to be engageable with ridges 465, which are formed in asymmetric fashion on an engageable cover 460 of the plug engagement portion 415. This arrangement can make the connection with the plug more firmly and avoid making a mistake in the connecting direction (specifically the polarity of the plastic optical fiber cable).

The spaces (the gaps 31) guide the leading portions 411 of the plug 400 to accept the beams 410 of the plug 400 therein, firmly fastening the beams therein as stated earlier. This arrangement can make the connection between the optical fiber connector and the plug firm, suppressing the plug 400 from swinging in a direction perpendicular to the connecting direction and maintaining the high transmission performance of a plastic optical fiber cable.

The connection port 105 of the receptacle housing 110 is tapered at the same angle of the mounting angle of the port cover 11 so as to be gradually reduced as the port edge comes closer to the lower wall 102 from the upper wall 101.

This arrangement can provide a dust-proof construction and prevent the receptacle 100 from being mounted to the body 10 in the wrong way. The tapered shape can provide smooth opening and closing of the port cover 11.

The rear housing 120 is an angular and hollow member, which reduces from both lateral walls 103 and 104 of the receptacle housing 110, and which includes a coupler (not shown) for accepting and coupling the plastic optical fiber cable 600 behind the wall surface, an elastic engageable latch 121 engageable with the receptacle housing 110, the tapered guide 122, the engageable shoulder 123 engageable with the elastic engageable latch 42 of the body 10, and the flanges 124.

Since the rear housing 120 has the reduced structure with respect to the receptacle housing 110, rear edges of projections formed on the beam leading portions 411 of the plug, which will be stated later, can be firmly engaged with the receptacle housing 110 to make the connection between the plug 400 and the receptacle 100 firm. Since the tapered guide 122 and the engageable shoulder 123 are formed in different shapes, the receptacle can be firmly mounted to the body 10. Since the elastic engageable latch 42 of the body and the tapered guide 122 are not engageable each other, improper mounting of the receptacle 100 in the vertical direction (specifically, the polarity of the receptacle 100 derived from the plastic optical fiber cable) can be avoided.

The rear housing 120 has a rear end close to the plastic optical fiber cable formed with the flanges 124, which are formed on both side walls 125 so as to increase the size as projections thereon from the upper wall to the lower wall. The flanges are different from each other in terms of an increase in size (projecting degree). This arrangement can limit the engagement between the receptacle housing 110 and the rear housing 120 to a single way to avoid improper engagement (specifically, the polarities of the housings 110 and 120 derived from the plastic optical fiber cable).

The side walls 125 of the rear housing 120 have a length set so as to precisely accept the elastic engageable latch 42 of the body 10 and the beam leading portions 411 of the plug 400 stated later therein. This arrangement can connect the plastic optical fiber cables together firmly without loosening the engagement with the body 10 and the connection with the plug.

The rear housing 120 and the plastic optical fiber cable 600 may be connected together by receptacle boots 150 and, e.g., ferrules generally used. The boots 150 are flexible hollow members formed in a cylindrical shape, which have a diameter tapered from a leading end toward a terminal end. The boots have an inner diameter set slightly greater than the diameter of the plastic optical fiber and an outer diameter set slightly smaller than the inner diameter of a cable sheath for the plastic optical fiber at the leading end. By this arrangement, the respective boots 150 are accepted into the cable sheath only by a certain length. The boots have an inner diameter at the terminal end set slightly smaller than the diameter of a ferrule holder, a wall thickness set at about 0.5 mm in their entirety, and a length set at about 30 mm.

Figure 12:
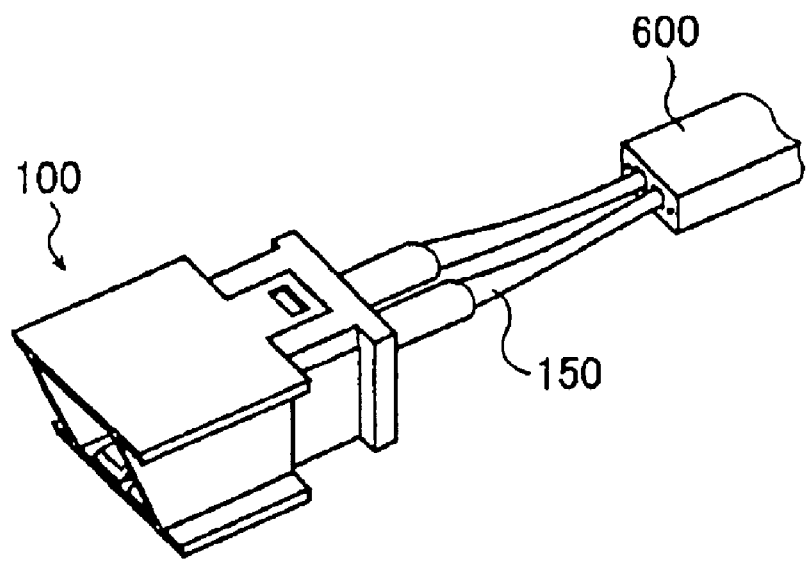
FIG. 12 is a perspective view showing how the receptacle is connected to a plastic optical fiber cable.

FIG. 12 is a perspective view showing how the receptacle and the plastic optical fiber cable are connected together. In FIG. 12, reference numeral 100 designates the receptacle, reference numeral 150 designates a boot, and reference numeral 600 designates the plastic optical fiber cable.

The receptacle and the plastic optical fiber cable are connected together by introducing the boots 150 into the respective plastic fiber fibers from the tapered leading ends to insert the leading ends into the plastic optical fiber cable sheath. After that, the plastic optical fibers are passed through the ferrules, and the terminal ends of the boots 150 are press-fitted into the holders to hold the boots. Thus, the plastic optical fiber cable has the end confined and aligned, and the aligned end is coupled to the rear housing of the receptacle 100.

Since the boots 150 used in the present invention are made of rubber, elastomer or the like unlike a method for confining and aligning the end by plastic material or metal having no flexibility in general, the degree of freedom between the plastic optical fiber cable 600 and the rear housing 120 becomes greater to provide good workability. The boots 150 can disperse stress in the plastic optical fiber cable to protect the fibers during bending.

Although stress is likely to be concentrated on exposed fibers projecting from the plastic optical fiber cable 600, the use of the boots 150 can disperse the stress to protect the fibers.

Explanation of the plug used in the present invention will be made in reference to FIGS. 6 to 8 and 11.

Figure 6:
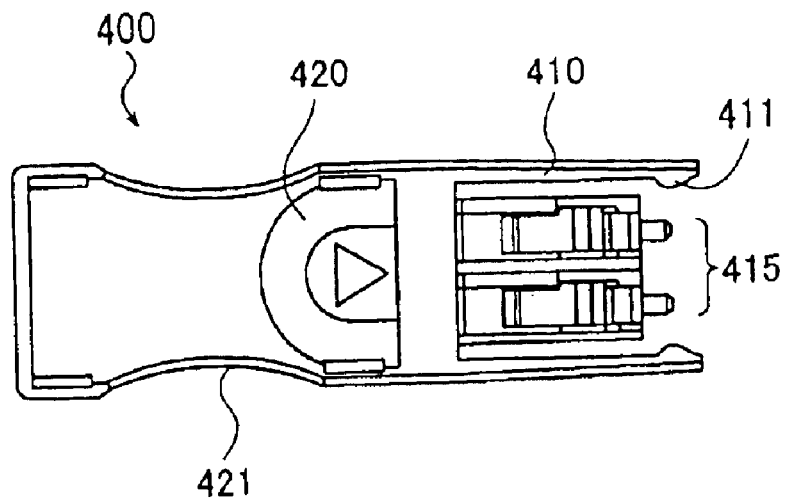
FIG. 6 is a front view of the plug.
Figure 7:
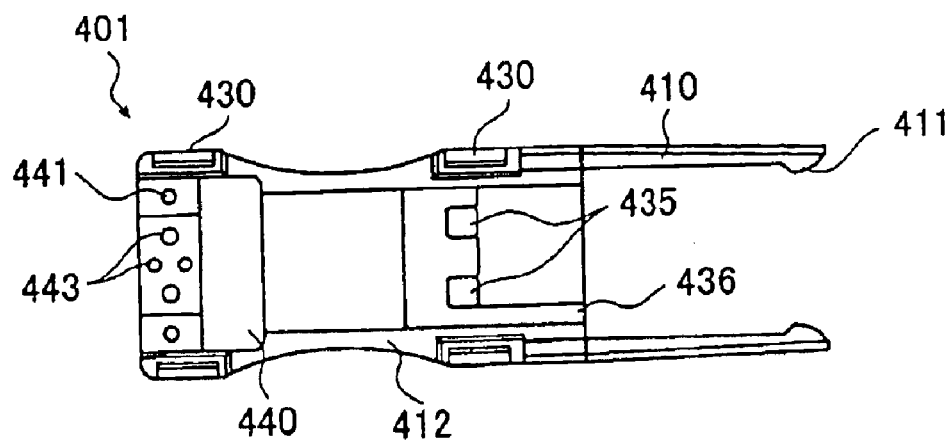
FIG. 7 is a front view of the inside of an upper housing.
Figure 8:
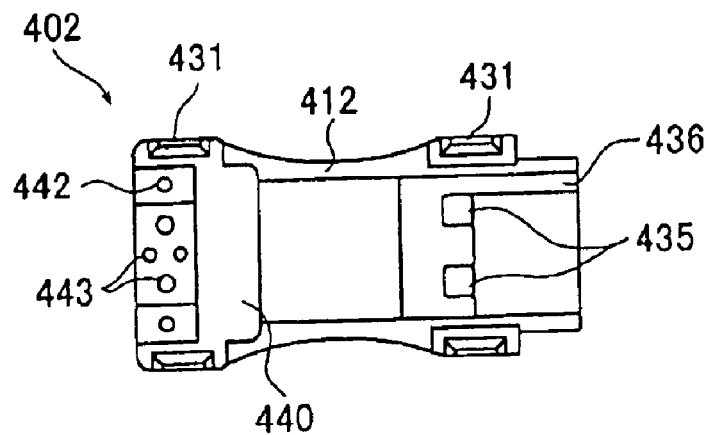
FIG. 8 is a front view of the inside of a lower housing.

FIG. 6 is a front view of the plug 400, which is assembled by engaging an upper housing 401 and a lower housing 402 with engageable shoulders 430 and elastic engageable latches 431, FIG. 7 is a front view of the inside of the upper housing 401, and FIG. 8 is a front view of the inside of the lower housing 402. In FIGS. 6 to 8 and 11, reference numeral 400 designates the plug, reference numeral 401 designates the upper housing, reference numeral 402 designates the lower housing, reference numeral 410 designates the beams, reference numeral 411 designates the leading portions, reference numeral 415 designates the engagement portion, reference numeral 420 designates the projected rib, reference numeral 435 designates projections for fastening the engageable cover, reference numeral 436 designates grooves for fastening the engageable cover, reference numeral 440 designates an optical fiber cable fastener housing groove, and reference numeral 443 designates cable holding projections.

The plug 400 according to the present invention includes the upper housing 401, the lower housing 402, the engagement portion 415 for plastic optical fibers and an optical fiber cable fastener 450.

Figure 11:
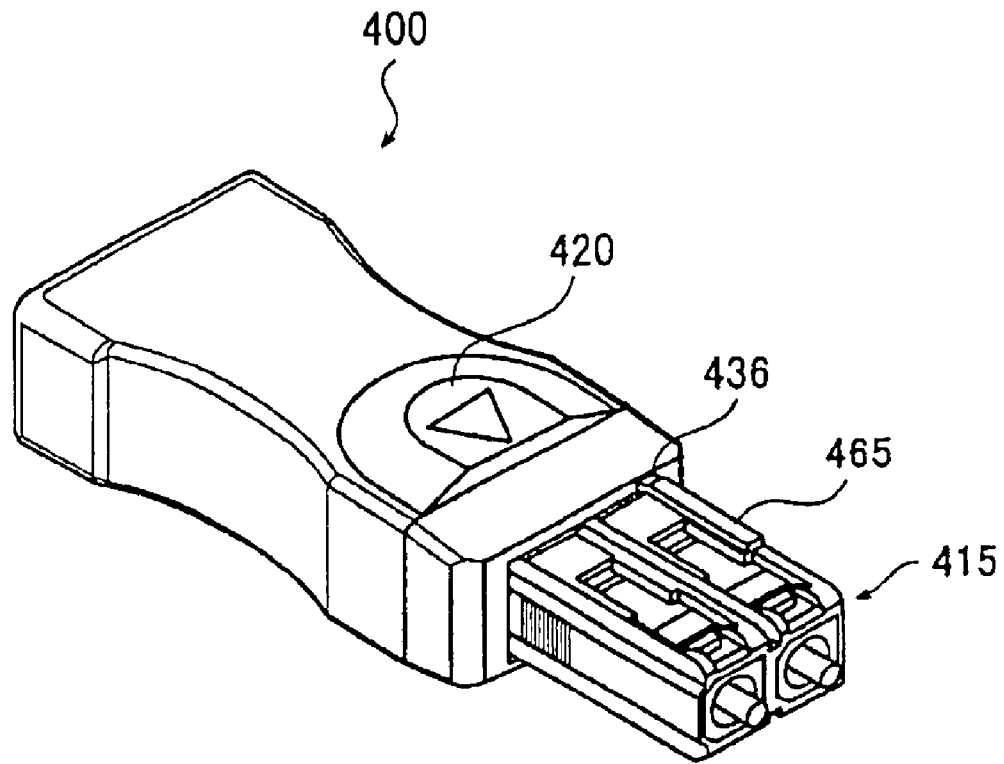
FIG. 11 is a perspective view of the plug.

FIG. 11 is a perspective view of the plug. Although the plug has a simple structure when it has no beams as shown in FIG. 11, it is preferable that the plug has the beams 410 having a greater length than the engagement portion 415 as shown in FIG. 6. The provision of the beams 410 can protect the engagement portion 415 to make the connection between the plug and the optical socket (the receptacle 100) sure and can guide the receptacle 100 by the leading portions 411 for easy connection.

Each of the beams 410 has the leading portion 411 formed with projections, which is formed so as to be tapered, having a projection height gradually reduced toward a leading edge thereof. This arrangement can make connection easy and reliable since the leading portions 411 are slidably guided in the gaps 31 defined by the receptacle 100 and the plug inlet port 30 along the wall surfaces of the gaps when the plug 400 is connected to the receptacle 100.

The plug 400 has each of substantially central portions on both sides in the longitudinal direction formed with a gripper 421 in an arc shape. The plug 400 has each of substantially central portions on outer surfaces of the upper housing 401 and the lower housing 402 formed with projected ribs 420, which are formed in a substantially semicircular shape so as to have substantially the same thickness as that of the guiding surface 21 of the port cover 11. The projected rib 420 of the upper housing 401 has a marking indicating the connection direction (surface) with the optical socket 1 engraved thereon. This arrangement can ensure reliable connection without swinging the plug in the vertical direction (in a direction perpendicular to the guiding surface 25) since a projected rib 420 gets in direct contact with the supporting surface 25 of the body 10 beyond the guiding surface 21 of the port cover 11 when the leading portions of the plug 400 of the plug 400 are inserted into the optical socket 1.

Referring now to FIG. 7 and FIG. 8, explanation of the upper and lower housings 401 and 402 will be made.

The plug 400 is a casing, which is formed by bringing the upper housing 401 and the lower housing 402 into engagement with each other, and wherein the upper housing 401 and the lower housing 402 are integrally combined by bringing the engageable shoulders 430 and the elastic engageable latches 431 into engagement with each other and bringing engageable holes 441 and press-fit pins 442 into engagement with each other.

Now, explanation of only the upper housing 401 will be made, and explanation of the lower housing will be omitted.

The upper housing 401 includes the beams 410, the cover fastening projections 435, the groove 436 for fastening the engageable cover, the groove 440 for housing the fastener for the plastic optical fiber cable, the cable holding projections 443, the engageable shoulders 430 and the engageable holes 441.

The cover fastening projections 435 are formed as a pair of projections on the leading side in a central portion in the longitudinal direction of the plug 400 and are brought into engagement with fastening holes 466 of an engageable cover 460 stated later to fix the upper and lower housings 401 and 402 and the engageable cover in their proper positions. The projections work to prevent the engageable cover 460 from shifting in the longitudinal direction of the plug after the receptacle 100 has been connected to the plug 400.

The upper housing 401 has the groove 436 engraved on the leading side of the substantially central portion so as to extend along one of side walls 412 in the longitudinal direction of the upper housing 401. The groove 436 is engaged with a ridge 465 formed on the engageable cover 460 to be fixed in its proper position. Since the groove 436 and the ridge 465 are, respectively, formed on the one side wall of the upper housing and one of the lateral sides of the engageable cover 460, the direction of fixing the engageable cover 460 to the upper and lower housings 401 and 402 is automatically set in a single direction, avoiding mistaking in the fixing direction (specifically, the polarity of the engageable cover 460 derived from the plastic optical fiber cable) (see FIG. 10 and FIG. 11). Since the receptacle 100 has the engageable grooves to mate with the ridges 465 engraved on only one of lateral portions in the engagement space 130, it is possible to avoid mistaking in the fixing direction (specifically, the polarity between the engageable cover 460 and the receptacle 100 derived from the plastic optical fiber cable) (see FIG. 10 and FIG. 11).

The upper housing 401 has the optical fiber cable fastener housing groove 440 engraved at a substantially central portion on a rear side to house the optical fiber cable fastener 450 for fastening the tension members in the plastic optical fiber cable stated later. This arrangement can fasten the plastic optical fiber cable firmly to prevent the engagement portion 415 from swinging.

The optical fiber cable fastener housing groove 440 has a rear portion formed with the cable holding projections 443 and the engageable holes 441. The cable holding projections 443 on both housings 401 and 402 are formed in a substantially conical shape to sandwich the covering material of the plastic optical fiber cable 600 from both upper and lower flat sides of the cable, fixing the engageable cover 460, the plastic optical fiber cable 600 and the like firmly.

Figure 9:
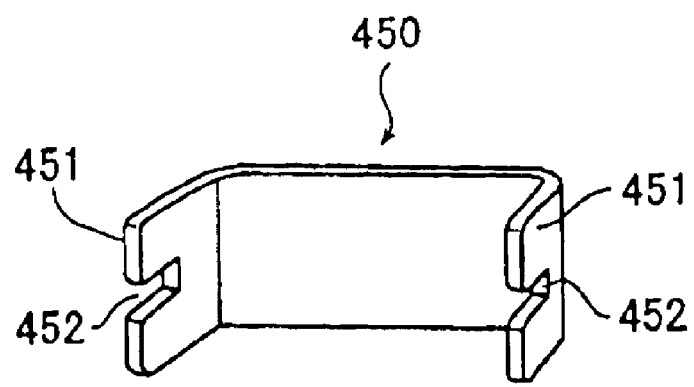
FIG. 9 is a perspective view of an optical fiber cable fastener.

Referring now to FIG. 9, explanation of the optical fiber cable fastener will be made.

FIG. 9 is a perspective view of the fastener. In FIG. 9, reference numeral 450 designates the optical fiber cable fastener, reference numeral 451 designates side walls of the fastener, and reference numeral 452 designates slits.

The optical fiber cable fastener 450 is molded in a U-character shape in section so as to have substantially the same width as the longer radius of the optical fiber cable in section. Each of the side walls 451 has a substantially central portion formed with the slit 452, which has a slightly narrower width than the diameter of a tension member to sandwich and fix the tension member therein.

The fixing is made by cutting the tension members of the plastic optical fiber cable 600 by a certain length, bending the cut portions of the tension members in directions substantially perpendicular to the longer radius of the cable 600 in section and inserting the bent portions into the slits 452 to fix the tension members. After the bent portions of the tension members have been inserted into the slits 452, the slits 452 may be deformed around open edges thereof to sandwich the tension members more firmly therein. This arrangement can closely incorporate the cable 600 and the fastener 450 into an integral structure to prevent the fibers from being damaged in the plug even if the cable 600 is drawn in the longitudinal direction. The fastener 450 is a small structure. The fastener 450 can fix two tension members by use of a single part and serve to reduce the size of the plug 400.

The engagement portion 415 according to the present invention, which is engaged with the receptacle 100, is made up of the engageable cover 460 and engagement parts, which are generally used in connection of a plastic optical fiber cable.

Examples of the engagement parts are ferrules, springs, housings, and cylindrical members. The plastic optical fiber cable is usually held, being urged with a spring or another part in a ferrule. Although the embodiment uses MU connectors, other types of connectors are applicable in the present invention.

Figure 10:
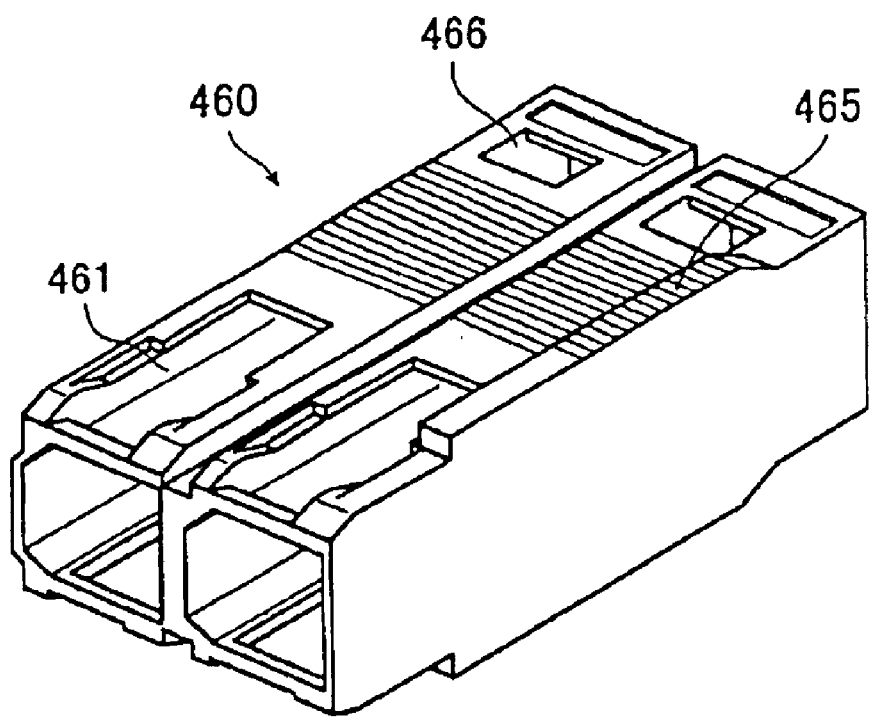
FIG. 10 is a perspective view of an engageable cover.

Referring now to FIG. 10, explanation of the engageable cover 460 will be made.

FIG. 10 is a perspective view of the engageable cover 460. In FIG. 10, reference numeral 460 designates the engageable cover, and reference numeral 465 designates the ridges for fastening the engageable cover.

The engageable cover 460 is mounted to the outer surface of an engagement member for connection with a plastic optical fiber cable, the shape of which is not limited to a specific form. The engageable cover works to fix and hold the plug 400 and the engagement member firmly.

The engageable cover 460 includes stopper grooves 461, the ridges 465 and the fastening holes 466.

The stopper grooves 461 have a certain length along the longitudinal direction of the engageable cover 460. The stopper grooves 461 are configured to allow the engagement member, not shown, to play in a certain range in combination with projections of the engagement member. This arrangement can urge the connected portions to make the connection firm when the plug 400 and the receptacle 100 are connected together.

The ridges 465 are formed along the longitudinal direction of the engageable cover 460 on only one of the lateral sides of the engageable cover so as to project from upper and lower surfaces of the engageable cover. This arrangement can avoid mistaking in the fixing direction between the engageable cover 460 and both housings 401, 402 and the engagement direction between the engageable cover 460 and the receptacle 100 (specifically, the polarities of the engageable cover 460, both housings 401, 402 and the receptacle 100 derived from the plastic optical fiber cable).

The fastening holes 466 are formed in the vicinity of a terminal end in the longitudinal direction of the engageable cover 460 to be engaged with the cover fastening projections 435 on both housings 401, 402 of the plug 400, fixing the engageable cover to both housings 401 and 401.

Each of the connector 2, the plate frame 4, the decorative plate 3, the port cover 11, the rear cover 13 and the tensile retainer 200 may be injection-molded from ABS resin, the attachment frame 6 may be injection-molded from modified PPO resin, each of the receptacle housing 110 and the rear housing 120 may be injection-molded from PPS resin, and each of the upper housing 401, the lower housing 402 and the engageable cover 460 may be injection-molded from PBT resin. The materials of these members are not limited to ones stated above.

The beams 410 of the plug 400 may be made of an elastic material, specifically PBT resin having glass incorporated therein, or have an elastic structure. For example, the beams may have roots provided with elastic structures in the form of bellows.

The boots 150 may be made of any kind of rubber, elastomer or the like, specifically silicone rubber, though the material of the boots is not limited to the ones stated above.

The fastener 450 may be made of metal, such as a cold-rolled steel plate, though the material of the fastener is not limited to the one stated above.

Now, explanation of how to connect the optical socket and the plug according to the present invention will be made.

First of all, the plastic optical fiber cable 600, which has been installed behind a wall, is drawn out of the wall, the plastic optical fiber cable 600 has the covering material at the leading portion stripped to expose the plastic optical fibers and the tension members, and the tension members are cut in the vicinity of the end portion of the covering material. The respective plastic optical fibers are passed through the tapered boots 150 from the leading edges, and the leading edges of the boots are inserted into the plastic optical fiber cable sheath. After that, the plastic optical fibers are inserted through the ferrule holders, and the terminal ends of the boots 150 are press-fitted into the holders to be held therein. Thus, the end of the plastic optical fiber cable is aligned.

The aligned end of the plastic optical fiber cable is mounted and connected to the rear housing of the receptacle 100.

The connector 2 and the attachment frame 6 may have preliminarily been engaged.

The receptacle 100 is housed into the receptacle mounting space of the body 10 by engaging the elastic engagement latch 42 with the engagement shoulder 123 of the receptacle 100. The plastic optical fiber cable 600 is inserted into the cable guide 40 of the body 10, and the end covering material of the cable 600 is brought into contact with the ridge 41 of the cable guide 40 to be fastened therein.

Next, the engagement recesses 221 of the tensile retainer 200 are located in the vicinity of the engageable convexes 50 of the body 10, and the engagement recesses 221 are pressed toward the plastic optical fiber cable (the rear end of the body 10 in the longitudinal direction) to bring the engagement recesses 221 and the engageable convexes 50 into engagement and the engagement projections 51 of the body 10 and the elastic engagement latches 220 of the tensile retainer 200 into engagement, fastening the tensile retainer 200 to the body 10. At that time, the leading edge of the cable guide 40 of the body 10 gets in alignment with the lower edge of the cable guide 210 of the tensile retainer 200 to provide a substantially semicircular cable guide.

After that, the plastic optical fiber cable 600 is located in the cable guide 210 of the tensile retainer 200, and the plastic optical fiber cable 600 is pressed into the fastening portion 230 formed at the terminal end of the cable guide 210 from the open end of the fastening portion 230 to be sandwiched at the fastening portion.

When the plastic optical fiber cable 600 is long, the plastic optical fiber cable is wound around the side walls 240 of the rear plate 201 of the tensile retainer 200.

Thus, the connection of the plastic optical fiber cable 600 installed behind the wall to the body 10 is completed.

The tensile retainer 200 with the plastic optical fiber cable held therein is housed in the wall-embedded box in accordance with the JIS standards, the attachment frame 6 is mounted to the wall-embedded box by a mounting method (screwing), and then the plate frame 4 is fastened to the attachment plate 6 by the plate attachment screws 5. The connecting operation and the assembling operation of the optical socket 1 is completed by bringing the engagement shoulders 63 of the attachment plate 4 and the elastic engagement latches of the decorative plate 3 into engagement for mounting of the decorative plate 3.

Next, explanation of how to assemble the plug will be made.

The other plastic optical fiber cable to be connected to the optical socket 1 has the covering material at the leading end stripped to expose the plastic optical fibers and the tension members, and ferrules are mounted on the respective plastic optical fibers by a usually used method. The ferrules are firmly covered with the engageable cover 460 according to the present invention to align the engagement portion 415. The respective exposed tension members are bent from the leading end of the covering material in directions substantially perpendicular to the longer radius of the cable in section, and the bent portions of the exposed tension members are inserted into the slits 452 formed in the side walls 451 of the fastener 450 to be sandwiched thereat. The connecting operation with respect to the fastener is completed by cutting the leading portions of the tension members such that the tension members can be housed in the plug.

The fastening holes 466 of the engageable cover 460 are engaged with the cover fastening projections 435 of the upper housing 401 and the lower housing 402, the ridges 465 of the engageable cover 460 are engaged with the cover fastening grooves 436 of the upper housing 401 and the lower housing 402, the fiber cable fastener 450 is housed in the cable fastener housing grooves 440, and the covering material of the plastic optical fiber cable is sandwiched between the cable holding projections 443. The assembling of the plug is completed by engaging the engageable shoulders 430 of the upper housing 401 with the elastic engageable latches 431 of the lower housing 402, and engaging the engageable holes 441 of the upper housing 401 with the press-fit pins 442 of the lower housing 402.

Explanation of how to connect the plug to the optical socket will be made.

The proper direction (proper side) of the plug to be connected is checked out based on the marking on the projected rib 420 provided on the plug. The plug is located in the vicinity of the body 10 of the optical socket 1, being held at the grippers 421 by fingers. First, the leading portions 411 of the plug 400 are put on the guiding surface 21 of the port cover 11. The body 10 has the top surface 27 formed with the slant surface 28. The top surface 27 may have a marking indicating the guiding surface 21 shown thereon to easily see the guiding surface 21. The beam leading portions 411 and the guiding grooves 22 of the guiding surface 21 are brought into alignment, and the port cover 11, which is urged by the springs 12, is depressed toward the wall against the urging force by the springs. When the port cover 11 is completely depressed, the connection port 105 of the receptacle 100 becomes visible.

When the plug 400 is moved toward the body 10 with the port cover 11 depressed, the leading portions 411 of the plug 400 get in contact with the lateral walls 103 and 104 of the receptacle 100. When the plug 400 is further moved, the tapered leading portions 411 are inserted into the gaps 31 defined by the lateral walls 103, 104 and another member. At that time, the beams 410, which are made of elastic material, expand outwardly. When the plug 400 is furthermore moved, the leading portions 411 slide on the outer surfaces of the lateral walls 103 and 104 of the receptacle 100 to guide insertion of the plug. When the leading portions 411 slide on the lateral walls 103 and 104 and reach the reduced rear housing 120, the expanded leading portions 411 contract inwardly and get in contact with the side walls 125 of the rear housing 120, and the rear edges of projections on the leading portions 411 are engaged with the receptacle housing 110, completing the connection between the optical socket 1 and the plug 400.

As explained, the assembling of the optical socket 1 and the plug 400, and the connection of both parts are made. In order to connect the two plastic optical fiber cables, it is necessary to conform the polarities of both cables each other since plastic optical fiber cables have their own polarities (the polarities of the two plastic optical fiber cables are different from each other).

In the receptacle 100, the receptacle housing 110, the rear housing 120, the engagement space 130, the upper housing 401, the lower housing 402 and the engageable cover 460 according to the present invention, the constituent parts have measures to avoid assembling or engagement with the polarities being not conformed.

Speaking specifically, the polarity of the plastic optical fiber cable 600 installed behind the wall is checked out before the plastic optical fiber cable is connected to the rear housing 120 of the receptacle 100. When the connection and the assembling of the optical socket 1 are completed as stated earlier, the polarity of the plastic optical fiber cable 600 installed behind the wall can be kept with respect to the polarity of the receptacle 100 of the optical socket 1. When the mounting of the engageable cover 460 is made to form the engagement portion 415 after the polarity of the other plastic optical fiber cable to be coupled to the plastic optical fiber cable 600 has been checked out, the polarity of the other plastic optical fiber cable can be kept with respect to the engagement portion 415. Whenever the receptacle 100 and the engagement portion 415 are engaged each other, the polarities of both plastic optical fiber cables are necessarily conformed since both receptacle and engagement portion can be engaged each other only in the direction wherein the polarities are conformed each other.

Since the respective constituent parts have the features (the polarity structures) derived from plastic optical fiber cables, it is possible to avoid making connection in the wrong way, though the polarities of plastic optical fiber cables need to be checked out at the job site whenever the cables are connected and assembled. It is also possible to make the connecting operation simpler and to save the time period required for the connecting operation.

The optical socket 1 and the plug 400 may be removed by drawing the plug 400 in the direction opposite to the body 10. The rear edges of the projections on the leading portions 411 of the beams 410 and the receptacle housing 110 of the receptacle 100 are configured to be disengaged in the engaged portions when a greater force than a certain drawing force is applied. In other words, when the plug 400 is drawn by a greater force than the certain drawing force, the connection between the optical socket 1 and the plug 400 is released. When the connection between the optical socket 1 and the plug 400 has been completely released, the port cover 11, which has been opened against the urging force of the springs 12, is automatically closed by the urging force of the springs 12 to provide a dust-proof construction.

Although the present invention has been described in order and in detail in reference to the preferred embodiments, the present invention is not limited to the preferred embodiments.

The present invention can provide the assembly comprising the plastic optical fiber socket and the plug, which is suited to the JIS standards, has a versatile and dust-proof construction, is easy to handle, is easy to install and is capable of maintaining the high transmission performance of a plastic optical fiber cables.

More specifically, the present invention can provide the assembly comprising the optical socket and the plug, which offers the following advantages:

1) The socket for a plastic optical fiber cable, which is attachable to three modules in accordance with JIS standards, is provided so as to be applicable to existing wiring accessories and be versatile, expanding the application of the socket.

2) Since the direction of connecting the plug and the receptacle is located so as to be parallel with a wall surface to install a plastic optical fiber cable, the projection of the plug from the wall surface can be minimized, the plastic optical fiber is hardly to be externally affected by furniture or the like, and the transmission performance can be maintained. Even if the plug is detached, a person is not adversely affected, and safety can be ensured. This is because light rays transmitted through a plastic optical fiber cable go out in a downward direction (in a direction toward a floor), and because it is difficult for him or her to look into the optical socket.

3) Since the tensile retainer has the cable guide formed so as to correspond to the recommended minimum radius of a plastic optical fiber cable, the cable can be fixed to be prevented from being bent with a smaller radius than the recommended minimum radius during installation, maintaining transmission performance.

4) When the port cover is provided at a slant angle conforming to the tapered shape of the receptacle connection port, the gap between the port cover and the receptacle can be eliminated to prevent dust from entering.

5) When the port cover has the guiding surface provided at a lower position than the body top surface, the guiding surface of the port cover can be made sure, and the port cover can be opened and closed easily and automatically.

6) When the guiding surface of the port cover has both lateral sides formed with the guiding grooves so as to guide the beam leading portions of the plug, the opening and closing operation of the port cover can be made smooth and well balanced, and a dust-proof construction can be provided.

7) When the body has the tapered shape defined by a surface, which is in contact with a circular arc having a radius corresponding to the recommended minimum radius of a plastic optical fiber cable, the projection of the body from the wall surface can be reduced to improve appearance, and the number of required parts can be decreased to improve cost performance.

8) When the body has the plug inlet port provided with the supporting surface for supporting the plug after connection, the plug is prevented from swinging in a direction perpendicular to the supporting surface after insertion of the plug, and the optical socket can provide stable support. Even if the plug is externally affected, the plug can be supported by the supporting surface, making it difficult for the fiber cable to be externally affected directly.

9) When the supporting surface has a front edge chamfered in the direction of connecting the plug to the receptacle, the plug can be inserted smoothly without a catch, and the projection of the body from the decorative plate can be reduced to improve appearance.

10) When the body has the cable guide provide on the rear side so as to correspond to the recommended minimum radius of a plastic optical fiber cable, the cable can be fixed to be prevented from being bent with a smaller radius than the recommended minimum radius during installation, maintaining transmission performance.

11) When the cable guide is provided at a position apart from the receptacle by a certain distance, a plastic optical fiber inserted into the receptacle can be suppressed from swinging, avoiding external affection to the fiber.

12) When the body has the engageable member provided on the rear side so as to have the receptacle mounted thereto in detachable fashion, the receptacle can be attached and detached easily, making installation easier.

13) When the tensile retainer has the ridge provided thereon to provide the fastening portion for sandwiching a plastic optical fiber cable, the ridge as the fastening portion can prevent the plastic optical fiber cable from being drawn, which is assumed to be caused during installation. The transmission performance can be maintained.

14) When the body and the tensile retainer have the engageable members provided thereon so as to be detachably engaged, the tensile retainer can be easily detached from the body, making installation easier and expanding application range, in, e.g., the case wherein installation is carried out at a place where the gap behind the wall is narrow. The tensile retainer can be firmly held to stabilize the plastic optical fiber cable during installation and to maintain the transmission performance.

15) When the tensile retainer has the rear plate provided as to have a narrower width than a wall-embedded box, when the plastic optical fiber cable is extended around the rear plate of the tensile retainer, and when the retainer is housed in the wall-embedded box, the cable can be easily housed in the wall-embedded box during installation, making the installation easier.

16) When the receptacle, which is connected to a plastic optical fiber cable having an end aligned by the cylindrical flexible parts (boots) having elasticity, is used, workability is improved, and the stress applied to the plastic optical fiber cable during bending can be dispersed to protect the plastic optical fiber.

17) When the receptacle, which includes the receptacle housing having the engagement space engageable with the plug, and the rear housing having a connector to be connected to a plastic optical fiber cable and formed so as to be reduced from the receptacle housing, is used, the receptacle can be firmly mounted to the body, and the receptacle can be firmly connected to the plug.

18) When the receptacle housing has gaps provided on both outer sides of the connection port (between the lateral walls of the receptacle and the plug inlet port of the body) so as to engageable with the beams of the plug and leading portions of the beams, the connection between the beams of the plug and the receptacle is made firm, preventing the plug from swinging in directions perpendicular to the connecting direction.

19) When the connection port of the receptacle housing is formed in a tapered shape, the gap between the port cover and the receptacle can be eliminated, preventing dust from entering.

20) When the rear housing of the receptacle has the tapered guide and the engageable shoulder, it is possible to avoid mistaking the mounting direction of the receptacle.

21) When the rear housing of the receptacle has the flanges, which are different from each other in terms of an increase in size, it is possible to avoid mistaking the mounting direction of the receptacle.

22) When the receptacle is configured to house the engagement latch and the beam leading portions of the plug in the reduced portions of the rear housing, the receptacle can be firmly fixed to the body, and the connection between the receptacle and the plug can be ensured.

23) When the beams of the plug are longer than the engagement portion, and when the beams have the leading portions with the projections tapered toward the leading edges, the beams can be guided during connection to make the connection easier, to fasten the plastic optical fiber cable firmly, and to protect the engagement portion of the plug.

24) When the housing of the plug has a projected rib formed in a substantially semicircular shape on a substantially central portion on an outer surface thereof, the rib can be brought into contact with the supporting surface of the body to prevent the plug from swinging in directions perpendicular to the supporting surface after insertion of the plug.

25) When the plug includes the optical fiber cable fastener, which is formed in a U-character shape in section so as to have substantially the same width as the longer radius of the optical fiber cable in section, and which has both side wall formed with the slits to sandwich the tension member therein, and the optical fiber cable fastener housing groove for housing the fastener, the plug can be made smaller. Even if the plug is externally affected, the fiber is hardly to be directly and externally affected since the engagement portion can be protected.

26) When the cable holding projections are provided on the rear portions of the optical fiber cable fastener housing grooves so as to project in the plug, a plastic optical fiber cable can be held more firmly.

27) When the engagement space of the receptacle housing has the engageable grooves formed in asymmetric fashion so as to be engageable with the engageable members of the plug, when the engagement portion include the engageable cover, which has the ridges formed on the upper and lower surfaces on one lateral side on the side of the plastic optical fiber cable leading edge so as to extend along the lateral side, and when the housing has the cover fastening grooves engraved along the one lateral side wall in the longitudinal direction on the leading side of the substantially central portion of the plug housing so as to be engageable with the ridges of the engageable cover, it is possible to avoid mistaking the connecting direction (the connecting sides).

The present application claims priorities under 35 U.S.C. §119 to Japanese Patent Application No. 2001-288747, filed on Sep. 21, 2001 and entitled "ASSEMBLY INCLUDING AN OPTICAL FIBER SOCKET AND AN OPTICAL FIBER PLUG". The contents of the application are incorporated herein by reference in their entirety.

What is claimed is:

1. An assembly comprising:
an optical fiber socket configured to removably connect to a plug;
the optical fiber socket comprising:
a body defining a plug inlet port,
port cover disposed on the body and configured to slide between a first position to cover the plug inlet port and a second position to uncover the plug inlet port,
a receptacle disposed on the body and configured to connect with an optical fiber cable, and
a tensile retainer disposed on the body and configured to retain the optical fiber cable; and
the plug comprising:
a housing,
an engagement portion disposed on the housing and configured to engage the receptacle, and
a beam disposed on the housing and configured to retain the plug in the optical fiber socket.

2. An assembly comprising:
an optical fiber socket configured to removably connect to a plug;
the optical fiber socket comprising:
a body defining a plug inlet port,
a port cover disposed on the body and configured to slide between a first position to cover the plug inlet port and a second position to uncover the plug inlet port,
a receptacle disposed on the body and configured to connect with an optical fiber cable, and
a tensile retainer disposed on the body and configured to retain the optical fiber cable; and
the plug comprising:
a housing,
an engagement portion disposed on the housing and configured to engage the receptacle, and
a beam disposed on the housing and configured to retain the plug in the optical fiber socket;
wherein the optical fiber socket is configured to connect to the plug in a vertical direction.

3. An assembly comprising:
an optical fiber socket configured to removably connect to a plug;
the optical fiber socket comprising:
a body defining a plug inlet port,
a port cover disposed on the body and configured to slide between a first position to cover the plug inlet port and a second position to uncover the plug inlet port, a receptacle disposed on the body and configured to connect with an optical fiber cable, and a tensile retainer disposed on the body and configured to retain the optical fiber cable, the tensile retainer comprising a cable guide configured to impede bending of the optical fiber cable beyond a predetermined radius; and the plug comprising:

a housing, an engagement portion disposed on the housing and configured to engage the receptacle, and a beam disposed on the housing and configured to retain the plug in the optical fiber socket;

wherein the optical fiber socket is configured to connect to the plug in a vertical direction.

4. The assembly according to claim 1, wherein the port cover is configured to be disposed at an angle in the body corresponding to a shape of a port of the receptacle.

5. The assembly according to claim 1, wherein the port cover comprises a guiding surface configured to be disposed at a position offset from a top surface of the body.

6. The assembly according to claim 5, wherein the guiding surface of the port cover comprises sides having guiding grooves configured to guide the plug.

7. The assembly according to claim 1, wherein the body comprises a tapered shape at a rear portion in a longitudinal direction thereof, the tapered shape configured to correspond to a radius of the optical fiber cable disposed in the optical fiber socket.

8. The assembly according to claim 1, wherein the body comprises a supporting surface configured to support the plug.

9. The assembly according to claim 8, wherein the supporting surface comprises a front edge chamfered in a direction of connecting the plug and the receptacle.

10. The assembly according to claim 1, wherein the body comprises a rear side having a cable guide configured to impede bending of the optical fiber cable beyond a predetermined radius.

11. The assembly according to claim 10, wherein the cable guide is disposed apart from the receptacle.

12. The assembly according to claim 1, wherein the body comprises a rear side having an engageable member configured to detachably mount to the receptacle.

13. The assembly according to claim 1, wherein the tensile retainer comprises a fastener having a ridge configured to engage the optical fiber cable.

14. The assembly according to claim 1, wherein the body and the tensile retainer comprise engageable members configured to detachably couple the body and the tensile retainer to one another.

15. The assembly according to claim 1, wherein the tensile retainer comprises a rear plate, the tensile retainer configured to be disposed in a wall-embedded box with the rear plate of the tensile retainer having the optical fiber cable extending therearound.

16. The assembly according to claim 1, further comprising:

an optical fiber cable comprising a boot.

17. The assembly according to claim 1, wherein the receptacle comprises:

a receptacle housing comprising an engagement space configured to engage the plug, and a rear housing comprising a connector configured to be connected to the optical fiber cable.

18. The assembly according to claim 17, wherein the receptacle housing defines gaps on outer sides of a connection port configured to engage the plug.

19. The assembly according to claim 17, wherein the receptacle housing comprises a connection port having a tapered shape.

20. The assembly according to claim 17, wherein the rear housing comprises a tapered guide and a shoulder.

21. The assembly according to claim 17, wherein the rear housing comprises flanges.

22. The assembly according to claim 17, wherein the rear housing comprises reduced portions configured to house a member of the body and the plug.

23. The assembly according to claim 1, wherein the beam comprises leading portions longer than the engagement portion.

24. The assembly according to claim 1, wherein the housing comprises a projected rib having a substantially semicircular shape on a substantially central portion on an outer surface thereof.

25. The assembly according to claim 1, wherein the plug comprises an optical fiber cable fastener having side wall including slits configured to receive a tension member of the optical fiber cable; and the housing comprises an optical fiber cable fastener housing groove configured to house the optical fiber cable fastener.

26. The assembly according to claim 25, wherein the optical fiber cable fastener housing groove comprises a rear portion having a cable holding projection configured to retain the optical fiber cable.

27. The assembly according to claim 1, wherein the receptacle housing comprises engageable grooves configured to be engageable with the plug;

the engagement portion comprises an engageable cover having ridges disposed on upper and lower surfaces on and along one of lateral sides in a longitudinal direction; and the housing comprises cover fastening grooves disposed on a leading portion in a substantially central portion, the engageable cover fastening grooves extending along one of lateral sides and configured to engage the ridges on the engageable cover.

28. An assembly comprising:

an optical fiber socket comprising:

a body defining a plug inlet port, and a port cover disposed on the body and configured to slide between a first position to cover the plug inlet port and a second position to uncover the plug inlet port, a plug configured to removably connect to the optical fiber socket, the plug comprising an engagement portion configured to engage the receptacle.

29. The assembly according to claim 28, wherein the optical fiber socket comprises a guide member configured to hold an optical fiber and to impede bending of the optical fiber beyond a predetermined radius.

30. The assembly according to claim 29, wherein the guide member is configured to be removable disposed in the body of the optical fiber socket.

* * * * *